(12) United States Patent
Ledoux et al.

(10) Patent No.: US 9,075,678 B2
(45) Date of Patent: Jul. 7, 2015

(54) CLIENT AND SERVER FOR INSTALLATION OF FILES EMBEDDED WITHIN A CLIENT PROFILE

(75) Inventors: Emmanuel Dimitri Christian Ledoux, Ft. Collins, CO (US); Matthieu Clemenceau, Wayne, PA (US); Fletcher Liverance, Kent, OH (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 911 days.

(21) Appl. No.: 13/219,890

(22) Filed: Aug. 29, 2011

(65) Prior Publication Data

US 2013/0054535 A1    Feb. 28, 2013

(51) Int. Cl.
*G06F 17/30*    (2006.01)
*G06F 9/445*    (2006.01)

(52) U.S. Cl.
CPC ........................................ *G06F 8/61* (2013.01)

(58) Field of Classification Search
CPC ................................................. G06F 17/30073
USPC ........................................................ 707/654
See application file for complete search history.

(56) References Cited

U.S. PATENT DOCUMENTS

| 7,539,700 | B2 * | 5/2009 | Powell et al. ........................ 1/1 |
| 7,702,646 | B2 | 4/2010 | Rabines et al. |
| 7,797,724 | B2 | 9/2010 | Calvin |
| 7,873,621 | B1 * | 1/2011 | Datar et al. .................... 707/706 |
| 2002/0152244 | A1 * | 10/2002 | Dean et al. ..................... 707/530 |
| 2003/0061323 | A1 | 3/2003 | East et al. |
| 2004/0187095 | A1 * | 9/2004 | Gilfix et al. .................... 717/120 |
| 2004/0260565 | A1 * | 12/2004 | Zimniewicz et al. ............. 705/1 |
| 2005/0055399 | A1 * | 3/2005 | Savchuk ....................... 709/203 |
| 2005/0131965 | A1 * | 6/2005 | Lam et al. ..................... 707/204 |
| 2007/0008973 | A1 | 1/2007 | Galea |
| 2007/0220032 | A1 * | 9/2007 | Kapoor et al. ................ 707/102 |
| 2008/0075049 | A1 | 3/2008 | Xie |
| 2008/0086719 | A1 | 4/2008 | Clemenceau et al. |
| 2008/0172664 | A1 * | 7/2008 | Nduaguba et al. ............ 717/174 |
| 2009/0100050 | A1 * | 4/2009 | Erol et al. ......................... 707/5 |
| 2009/0172160 | A1 * | 7/2009 | Klein ............................. 709/225 |
| 2010/0146600 | A1 * | 6/2010 | Eldar et al. ........................ 726/5 |
| 2011/0047230 | A1 * | 2/2011 | McGee .......................... 709/206 |
| 2011/0119290 | A1 * | 5/2011 | Dhoble .......................... 707/769 |
| 2012/0030135 | A1 * | 2/2012 | Weiss et al. ................... 705/347 |

\* cited by examiner

*Primary Examiner* — Noosha Arjomandi
(74) *Attorney, Agent, or Firm* — Hewlett-Packard Patent Department

(57) ABSTRACT

Example embodiments relate to distribution of a profile from a server to a client. In example embodiments, a server enables an administrator or other user to embed a file into a profile, where the profile is a structured document including the file and a storage location for the file on the client. The server may then transmit the profile to the client, which, upon receipt of the profile, may extract the embedded file from the structured document to a storage location on the client specified in the profile.

16 Claims, 5 Drawing Sheets

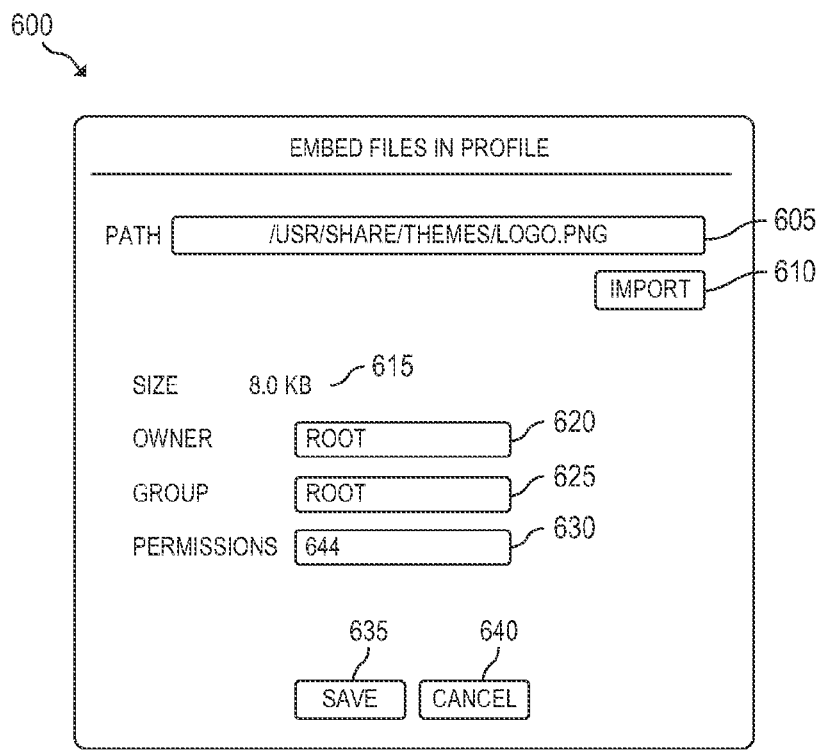

*FIG. 6*

```
<PROFILE>
  <PROFILESETTINGS>
    <NAME>NEW-PROFILE</NAME>
  </PROFILESETTINGS>
  <PROFILEFILES>
    <FILE NAME="LOGO.PNG">
      <PATH>/USER/LOGOS</PATH>
      <PERMISSIONS>0444</PATH>
      <GROUP>ADMINS</GROUP>
      <OWNER>ADMIN</OWNER>
      <CONTENT>IVBORwjdkeirja390jkad930DFJ39djk30Dj3kda
        dDF03jDK93r3jKDF93jDbngncme9340892jND93lojsdf+j34/
        A/934liajsdfkl39/wDKFJh3nsdfl</CONTENT>
    </FILE>
  </PROFILEFILES>
</PROFILE>
```

*FIG. 7*

CLIENT AND SERVER FOR INSTALLATION OF FILES EMBEDDED WITHIN A CLIENT PROFILE

BACKGROUND

In a thin or zero client architecture, a client device relies heavily on a server for processing, storage, or performance of other tasks. For example, the client may connect to the server using a networking protocol and subsequently provide the server with requests, while receiving processed data from the server. Because of the reliance on the server for more hardware-intensive tasks, the thin or zero client may include relatively inexpensive hardware, while providing the user with an experience similar to using a full-featured personal computer.

BRIEF DESCRIPTION OF THE DRAWINGS

The following detailed description references the drawings, wherein:

FIG. 6 is a diagram of an example user interface presented by a server for embedding files within a client profile; and FIG. 7 is an example structured document for use as a client profile.

DETAILED DESCRIPTION

As detailed above, thin and zero client architectures enable a client device to rely heavily on a server for certain tasks. For example, in some architectures, each client implements only the core functionality required to run the remoting protocols used for communication with the server. More specifically, the client may include a small operating system core that initializes the required network protocols, locates and connects to a server, and thereafter manages the exchange of data with the server via the initialized network protocols. Given the relatively limited functionality of the client, such architectures allow for the use of inexpensive client devices.

Because of the client's limited functionality, however, these architectures complicate the process of distributing files to a client. In particular, given the goal of simplifying the software as much as possible, these client operating systems generally omit functionality for managing software profiles of client devices. Such implementations ensure that the client operating system is light, fast, and secure, but prevent a system administrator from using a client to generate a profile for distribution to other clients.

Example embodiments disclosed herein address these concerns by enabling a system administrator to use a server-based interface to create a client profile including embedded files to be distributed and installed on client devices. For example, a server may present a user interface (UI) that enables a system administrator to create a profile, which may be a structured document (e.g., an XML file) that includes an embedded file and metadata describing the embedded file. The server may then transmit the profile to a client, which, in response, may determine the storage location for the embedded file using the metadata and extract the embedded file to the appropriate location on the client.

In this manner, example embodiments disclosed herein allow for profile management and distribution using a server, thereby eliminating the requirement for client-based management of profiles. In particular, example embodiments enable an administrator or other user to easily embed files into a profile and to subsequently distribute the profile to one or more client devices for installation of the files at the specified locations. Furthermore, because the files may be embedded within a single profile file, example embodiments allow the files stored on a client to be cleanly modified and restored without the use of complex installation, uninstallation, and version tracking procedures.

Figure 1:
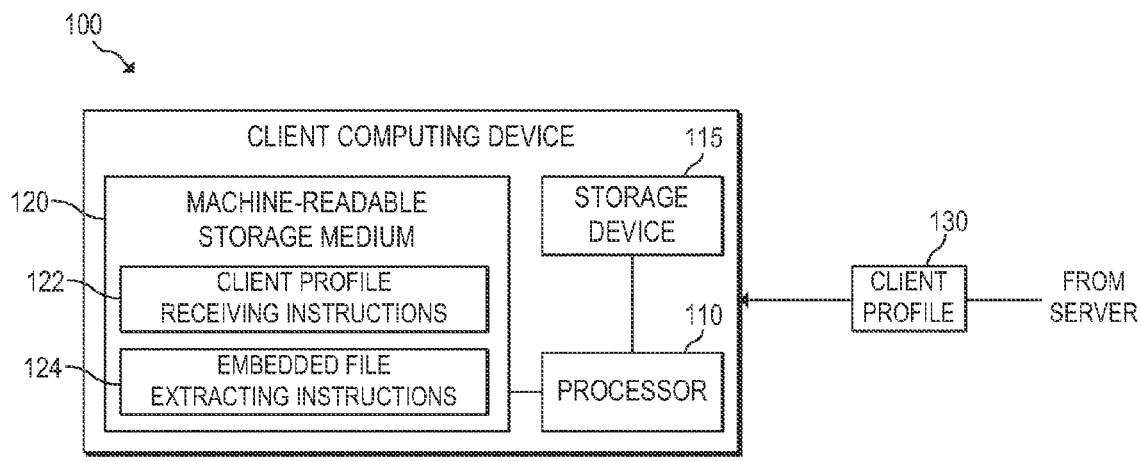
FIG. 1 s a block diagram of an example client computing device for installing embedded files included in a client profile.

Referring now to the drawings, FIG. 1 is a block diagram of an example client computing device 100 for installing embedded files included in a client profile 130. Client computing device 100 may be, for example, a notebook computer, a desktop computer, an all-in-one system, a thin client, a workstation, a tablet computing device, a mobile phone, or any other computing device suitable for execution of the functionality described below. In the implementation of FIG. 1, client computing device 100 includes processor 110, storage device 115, and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124 to implement the procedure for installing files included within a client profile, as described below. As an alternative or in addition to retrieving and executing instructions, processor 110 may include one or more electronic circuits comprising a number of electronic components for performing the functionality of one or more of instructions 122, 124.

Storage device 115 may be any storage device suitable for storage of a file embedded within a client profile 130 obtained from a server. For example, storage device 115 may be a hard disk drive, a solid state drive, a hybrid drive including both rotating media and non-volatile memory, flash memory, or any other type of storage device. Storage device 115 may be installed internally within client 100 or may instead be coupled to client 100 via an external bus. Regardless of the particular implementation, storage device 115 may be the target device for storing one or more files embedded within a client profile 130, as described in further detail below.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. In some implementations, storage medium 120 may be the same device as storage device 115. As described in detail below, machine-readable storage medium 120 may be encoded with executable instructions for receiving and installing a client profile 130.

The instructions encoded on storage medium 120 may be executed upon initialization of a routine for downloading client profile 130 from a server. For example, instructions 122, 124 may be executed by the operating system of client 100 to obtain client profile 130. Thus, upon boot-up or at any other time during operation, client 100 may contact a server to determine whether a new or updated profile 130 is available and, if so, trigger receiving instructions 122 to initiate the profile installation procedure.

Client profile receiving instructions 122 may then receive client profile 130 from a server. The received profile 130 may be any file or set of files containing information used to configure, update, or otherwise transmit data to client 100 from a corresponding server. For example, in a thin client architecture, profile 130 may contain data used to establish communications with the server with a particular remoting protocol and to otherwise configure the thin client. Regardless of the particular format of profile 130, the profile may include one or more embedded files to be written to storage device 115 of client 100, as described further below. Client 100 may use these files to install new or updated data, such as certificates, configurations, improved application binaries, and the like.

In some implementations, the profile 130 may be formatted as a structured document including the embedded files and metadata relating to the embedded files. In other words, the profile 130 may be a document that uses any type of coding to apply a structure specified in a schema and the file may be encoded directly within the structured document. To name a few examples, the profile 130 may be formatted as a Hypertext Markup Language (HTML) document, an Extensible Markup Language (XML) document, or another type of document that uses tags according to syntactic rules of a markup language. The one or more files may be embedded within the structured document as a text string (e.g., a base64 string) or other data type, such that the files are transmitted within the profile 130. Profile 130 may also include metadata describing each file, such as a storage location for the file on the client (e.g., a file name and path), file permissions, and file ownership information.

Embedded file extracting instructions 124 may use the metadata included in profile 130 to determine a storage location for each embedded file on client 100. For example, the profile may include a set of tags that encode a file name for the file and another set of tags that encode the path for the file. In such implementations, instructions 124 may simply read each file name and path from the tags in profile 130 to determine the target storage location for each embedded file.

After determining the appropriate storage location, extracting instructions 124 may then extract each embedded file from the structured document to the corresponding storage location. For example, extracting instructions 124 may read the embedded file from profile 130, convert the file to a different encoding format as necessary, and write the contents of the file to storage device 115 at the specified path and file name. As a more specific example, when the file is embedded in profile 130 as a text string, such as a base64 string, extracting instructions 124 may convert the string to binary data and write the binary data to storage device 115. Extracting instructions 124 may also write the additional metadata, such as file permissions and file ownership information, to storage device 115.

Figure 2:
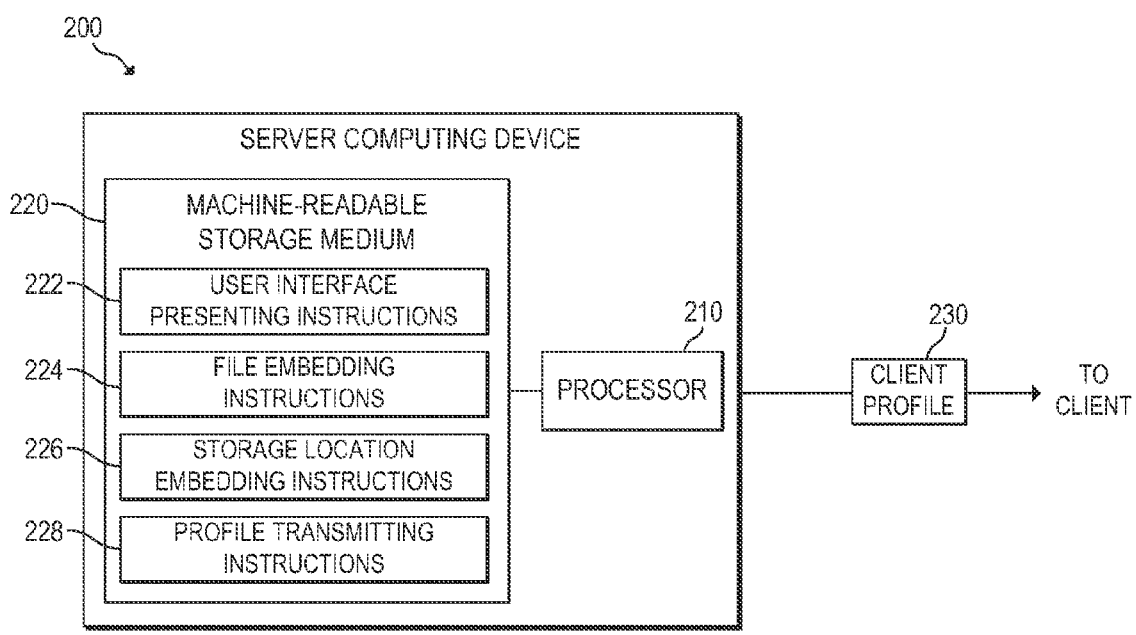
FIG. 2 is a block diagram of an example server computing device for generating a client profile including embedded files.

FIG. 2 is a block diagram of an example server computing device 200 for generating a client profile 230 including embedded files. Server computing device 200 may be, for example, a Local Area Network (LAN) server, a web-based server, or any other computing device suitable for generating and distributing a client profile 230 to one or more clients. In the embodiment of FIG. 2, server computing device 200 includes a processor 210 and a machine-readable storage medium 220.

As with processor 110 of FIG. 1, processor 210 may be one or more CPUs, microprocessors, and/or other hardware devices suitable for retrieval and execution of instructions. Processor 210 may fetch, decode, and execute instructions 222, 224, 226, 228 to implement the profile creation and distribution procedure described below. Processor 210 may also or instead include electronic circuitry for performing the functionality of one or more instructions 222, 224, 226, 228. As with storage medium 120 of FIG. 1, machine-readable storage medium 220 may be any physical storage device that contains or stores executable instructions.

Server 200 may execute instructions 222, 224, 226, 228 to allow a system administrator or other user to create a client profile 230 and distribute the profile 230 to one or more client devices. Server 200 may execute the instructions as part of a locally-accessible application or, alternatively, as a web service or application accessible to the user from a remote device.

User interface presenting instructions 222 may present a user interface enabling a user to create a profile 230 to be subsequently installed on a client. The user interface may allow the user to select each file to be embedded within the profile 230 and to specify a storage location for each file on the client device. For example, the user interface may display a directory tree, such that the user can navigate to a storage location to specify the file to be embedded. The user interface may further include a text box or other input element that allows the user to enter the target path for the file on the client. In addition, the user interface may include input elements for receiving user entry of file permissions and ownership information. An example user interface displayed by server 200 is described further below in connection with FIG. 6.

When the user has provided the necessary information within the user interface, file embedding instructions 224 may then embed the specified file within profile 230. In implementations in which profile 230 is a structured document, instructions 224 may embed the profile within a set of tags in the document. For example, instructions 224 may access the binary contents of the file, convert the binary to a text string (e.g., a base64 string), and write the text string within the set of tags in the document.

Storage location embedding instructions 226 may then embed the target storage location on the client within profile 230. Continuing with the previous example, when profile 230 is a structured document, instructions 226 may embed the target storage location within another set of tags in the document. Embedding instructions 226 may additionally embed any further metadata within profile 230, such as file permissions and file ownership information. Again, instructions 226 may embed the permissions and ownership information within sets of tags in profile 230.

After execution of instructions 224, 226, client profile 230 is ready for transmission to client devices. Accordingly, profile transmitting instructions 228 may transmit profile 230 to one or more clients for installation of each embedded file at the storage location specified within the profile 230.

Figure 3:
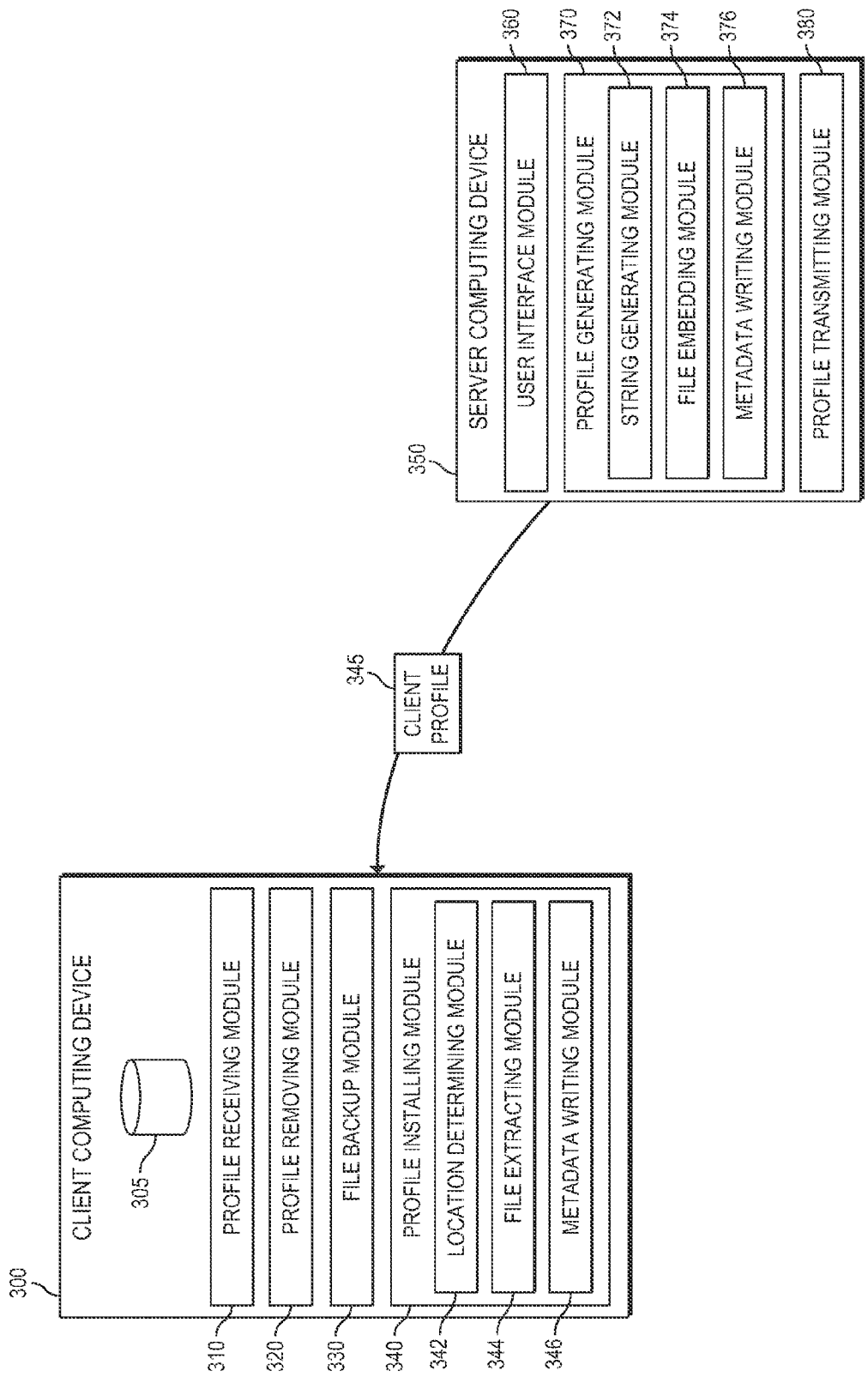
FIG. 3 is a block diagram of an example client computing device in communication with an example server computing device for generating and installing a client profile including embedded files.

FIG. 3 is a block diagram of an example client computing device 300 in communication with an example server computing device 350 for generating and installing a client profile 345 including embedded files. As illustrated in FIG. 3 and described below, client computing device 300 may communicate with server computing device 350 to download and install a client profile 345 on a storage device 305.

As illustrated, client computing device 300 may include a number of modules 310-346 for receiving and installing a client profile 345. Similarly, server computing device 350 may include a number of modules 360-380 for generating and transmitting a client profile 345. Each of the modules may include a series of instructions encoded on a machine-readable storage medium and executable by a processor of either client 300 or server 350. In addition or as an alternative, each module may include one or more hardware devices including electronic circuitry for implementing the functionality described below.

Profile receiving module 310 of client 300 may receive a client profile 345 transmitted by a corresponding server computing device 350. As detailed above, client profile 345 may be any file or set of files containing information used to configure client 300 using data provided by server 350. In some implementations, profile 345 may be formatted as a structured document including embedded files and metadata describing the embedded files.

Prior to installation of profile 345, profile removing module 320 may initially determine whether a previously-installed profile should be removed to restore client 300 to its initial configuration. If so, profile removing module 320 may restore any files that were overwritten when client 300 installed the previous profile. For example, profile removing module 320 may identify files that were overwritten when installing the previous profile and restore a backup copy generated by the backup module 330 for each of the files. More specifically, profile removing module. 320 may overwrite an entire file with a copy of the file previously created by backup module 330. Alternatively, removing module 320 may use a difference the previously created by backup module 330 to only overwrite the blocks that were changed when the file was installed. In this manner, client 300 may ensure that a previous profile is uninstalled prior to installing a new profile. Note that, in some situations, profile removing module 320 may also be triggered to remove a previously-installed profile and thereby restore client 300 to its initial configuration, even when a new profile will not be installed.

File backup module 330 may preserve the state of storage device 305 prior to installing the profile 345, such that profile removing module. 320 may subsequently uninstall the profile 345. For example, file backup module 330 may determine whether a file exists at the location on storage device 305 specified by the target path and file name for a file embedded in client profile 345. If so, the backup module 330 may then generate a backup of the file on storage device 305 that the embedded file will replace. For example, the backup module 330 may create a copy of the file to be replaced and store the duplicate on storage device 305. As another example, the backup module 330 may compare the blocks of the existing file to the blocks of the file embedded in profile 345 to create a difference file that only stores the blocks that are identified as different between the two files. In this manner, file backup module 330 may create a backup of each the to be replaced, updated, or otherwise modified by profile 345, such that profile removing module 320 may subsequently remove profile 345 from client 300, as described above.

Profile installing module 340 may manage the process for installing client profile 345 on client 300. Upon receipt of profile 345 by profile receiving module 310, installing module 340 may first trigger location determining module 342.

Determining module 342 may then determine the target storage location on storage device 305 for any files embedded within client profile 345. For example, when profile 345 is a structured document, determining module 342 may read tags within the document that specify the target file name and path of a given file.

File extracting module 344 may then extract each embedded file from profile 345 to the determined location on storage device 305. For example, extracting module 344 may read an embedded file from profile 345, convert the file to binary data as necessary, and write the binary data to the determined storage location on storage device 305. After writing an embedded file to storage device 305, metadata writing module 346 may then write any additional metadata included in profile 345. For example, when the metadata includes file permissions and ownership information, metadata writing module 346 may write the permissions and ownership information to storage device 305 as attributes of the written file.

Server computing device 350 may include a user interface module 360 for enabling a user to create a profile 345 to be installed on client 300. The user interface may present user interface elements that allow the user to specify one or more files to be embedded in profile 345, a target location for the files on client 300, file permissions, and file ownership information.

Figure 4A:
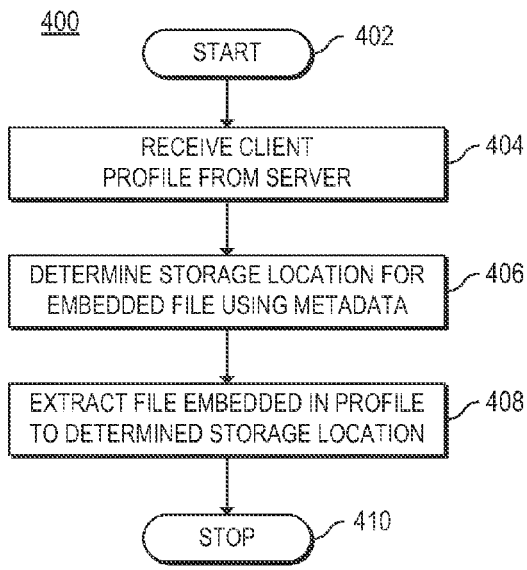
FIG. 4A is a flowchart of an example method for installing embedded files included in a client profile received from a server.

When the user has provided the necessary information to user interface module 360, profile generating module 370 may then manage the process for generating client profile 345. For example, when profile 345 is a structured document such as an XML file, string generating module 372 may read the binary data for each file to be embedded within profile 345 and convert the binary data to a text string, such as a base64 string. File embedding module 374 may then write the string for each file within a corresponding a set of tags in the profile 345, such that each file is embedded within profile 345. Finally, metadata writing module 376 may write metadata for each file to profile 345, such as the target path and name of the file, file permissions, and file ownership information. After generating module 370 has generated the profile 345, profile transmitting module 380 may then transmit profile 345 to client 300 for installation of the embedded file(s) on the client, FIG. 4A is a flowchart of an example method 400 for installing embedded files included in a client profile received from a server. Although execution of method 400 is described below with reference to client computing device 100, other suitable devices for execution of method 400 will be apparent to those of skill in the art (e.g., client computing device 300). Method 400 may be implemented in the form of executable instructions stored on a machine-readable storage medium, such as storage medium 120, and/or in the form of electronic circuitry.

Method 400 may start in block 402 and proceed to block 404, where client 100 may receive a client profile 130 from a server. As detailed above, client profile 130 may be a structured document including one or more embedded files and metadata relating to the embedded file(s). For example, each file and a corresponding file name and path may be embedded within tags of the structured document.

After receipt of the client profile 130, method 400 may continue to block 406, where client 100 may determine the storage location for a file embedded in profile 130 using the corresponding metadata. For example, when profile 130 is a structured document, client 100 may read the metadata from tags in the document and thereby determine the target storage path and file name of the embedded file.

Next, in block 408, client 100 may extract the file embedded in profile 130 to the storage location determined in block 406. Continuing with the previous example, when profile 130 is a structured document, client 100 may read the embedded file from the tags, convert the data to binary as necessary, and write the binary data to a storage device 115. Client 100 may then repeat blocks 406 and 408 for each additional file embedded in the received profile 130. After writing all files to a storage device 115, method 400 may stop in block 410.

Figure 4B:
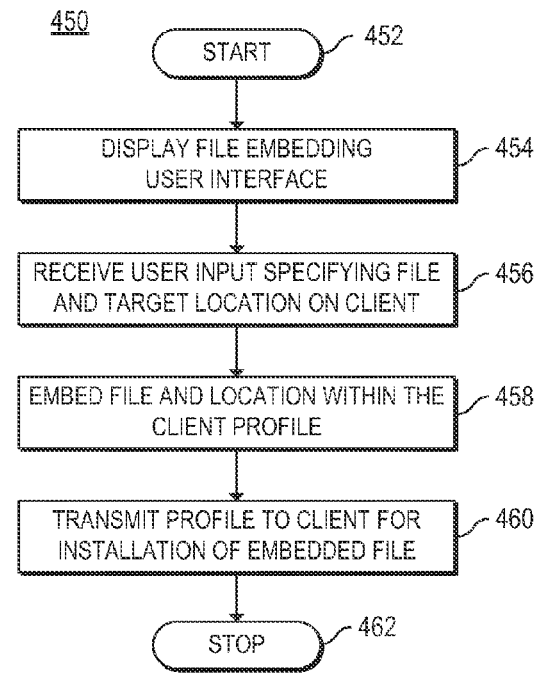
FIG. 4B is a flowchart of an example method for generating a client profile including embedded files for transmission to a client.

FIG. 4B is a flowchart of an example method 450 for generating a client profile including embedded files for transmission to a client. Although execution of method 400 is described below with reference to server computing device 200, other suitable devices for execution of method 450 will be apparent to those of skill in the art (e.g., server computing device 350). Method 450 may be implemented in the form of executable instructions stored on a machine-readable storage medium, such as storage medium 220, and/or in the form of electronic circuitry.

Method 450 may start in block 452 and continue to block 454, where server 200 may display a user interface for enabling a user to embed one or more files within a profile 230. The interface may include, for example, a UI element for selecting a file to be embedded, a UI element for specifying a file name, and a UI element for specifying a target path for the file on the client. In block 456, server 200 may receive input from the user based on interaction with the displayed interface and thereby identify a file to be embedded in profile 230 and a target location for the file on the client.

Next, in block 458, server 200 may embed the specified file and target location with profile 230. For example, to embed the file, server 200 may convert the binary data of the file to a text string and embed the text string within tags of profile 230. Similarly, to embed the file name and path, server 200 may create a set of tags for each attribute and write the file name and path within the corresponding set of tags. Server 200 may then repeat blocks 456 and 458 for each additional file to be embedded within profile 230. After all files are embedded within profile 230, method 450 may continue to block 460, where server 200 may transmit the profile to client 100 for installation of the embedded file(s) at the specified storage location(s). Method 450 may then stop in block 462.

Figure 5A:
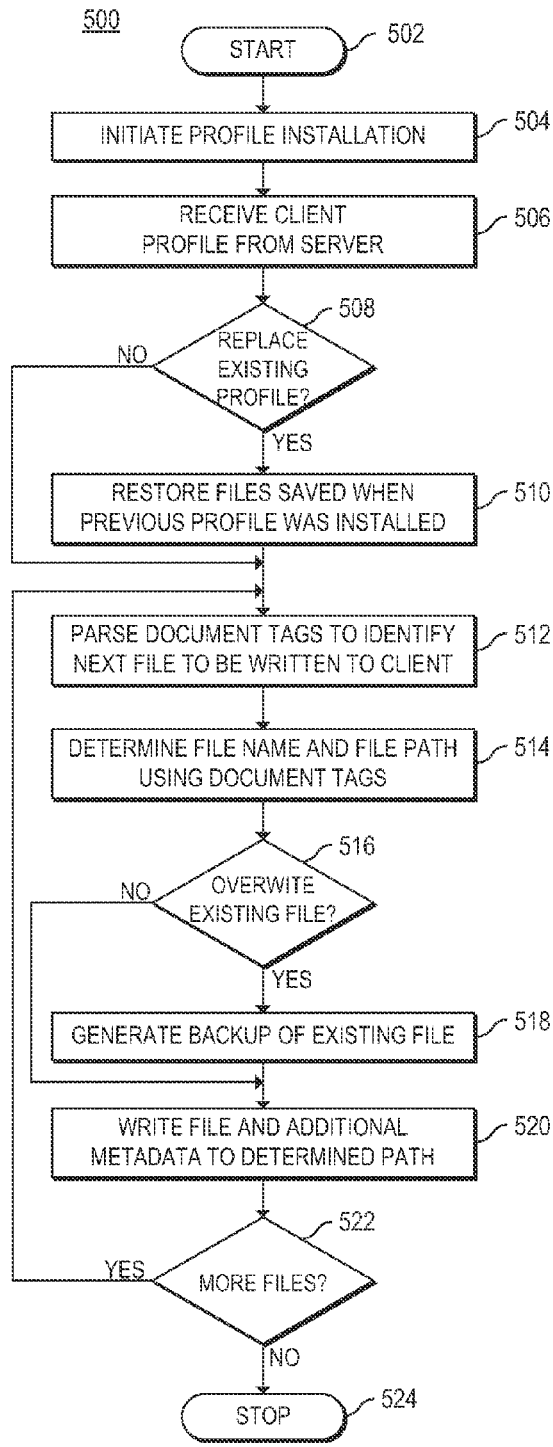
FIG. 5A is a flowchart of an example method for installing embedded files included in a client profile received from a server, the method creating and using backup files to maintain files on the client.

FIG. 5A is a flowchart of an example method 500 for installing embedded files included in a client profile received from a server, the method 500 creating and using backup files to maintain files on the client. Although execution of method 500 is described below with reference to client computing device 300, other suitable devices for execution of method 500 will be apparent to those of skill in the art. Method 500 may be implemented in the form of executable instructions stored on a machine-readable storage medium and/or in the form of electronic circuitry.

Method 500 may start in block 502 and proceed to block 504, where client 300 may initiate a profile installation procedure. For example, the user may power-on, restart, or otherwise boot client 300 and the boot process may trigger a profile downloading routine. Alternatively, client 300 may trigger the profile downloading routine during execution of a primary operating system of client 300. Regardless of how it is triggered, the profile downloading routine may be configured to detect a server 350 and communicate with the server 350 to determine whether a new or updated profile 345 is available for installation. If a profile 345 is available for installation, client 300 may then receive the client profile 345 from the server 350 in block 506.

In block 508, client 300 may then determine whether the profile 345 will replace an existing profile. If so, client 300 may then restore files saved when a previous profile was installed. For example, client 300 may access a backup file for each file that was modified when client 300 installed the previous profile. Client 300 may then write each backup file to the corresponding location on storage device 305, thereby restoring the original configuration of client 300. Method 500 may then continue to block 512. Alternatively, when client 300 determines in block 508 that the profile will not replace an existing profile, method 500 may skip directly to block 512.

In block 512, client 300 may parse the document tags of profile 345 to identify a next file to be written to storage device 305 of client 300. For example, client 300 may inspect profile 345 to identify an opening bracket of a tag used to designate embedded files (e.g., "<FILE>"). In block 514, client 300 may then determine the file name and path of the file identified in block 512 using the tags within profile 345.

Next, in block 516, client 300 may determine whether the file identified in block 512 will overwrite an existing file on storage device 305. For example, client 300 may access the storage path and file name identified in block 514 to determine whether a file is currently stored in storage device 305 at that path and file name. If so, client 300 may then create a backup of the existing file in block 518. The backup may be a complete copy of the existing file or, alternatively, a difference file identifying blocks that are different between the existing file and the file to be installed. Method 500 may then continue to block 520. Alternatively, when client 300 determines in block 516 that the file embedded in profile 345 will not overwrite an existing file, method 500 may skip directly to block 520.

In block 520, client 300 may then write the embedded file and any additional metadata to the path and file name identified in block 514. For example, client 300 may extract the contents of the file from tags within profile 345, convert the contents to binary as necessary, and write the binary data to the identified location on storage device 305. Client 300 may also write metadata specified in profile 345 to storage device 305 in association with the stored file. The metadata may specify, for example, file permissions and the ownership information.

After writing the current file and any metadata to storage device 305, method 500 may then continue to block 522, where client 300 may determine whether additional files are embedded within profile 345. For example, client 300 may parse the tags of profile 345 to identify an opening bracket identifying an additional embedded file. If an additional file is present in profile 345, method 500 may return to block 512 for processing of the file. Otherwise, method 500 may continue to block 524, where method 500 may stop.

Figure 5B:
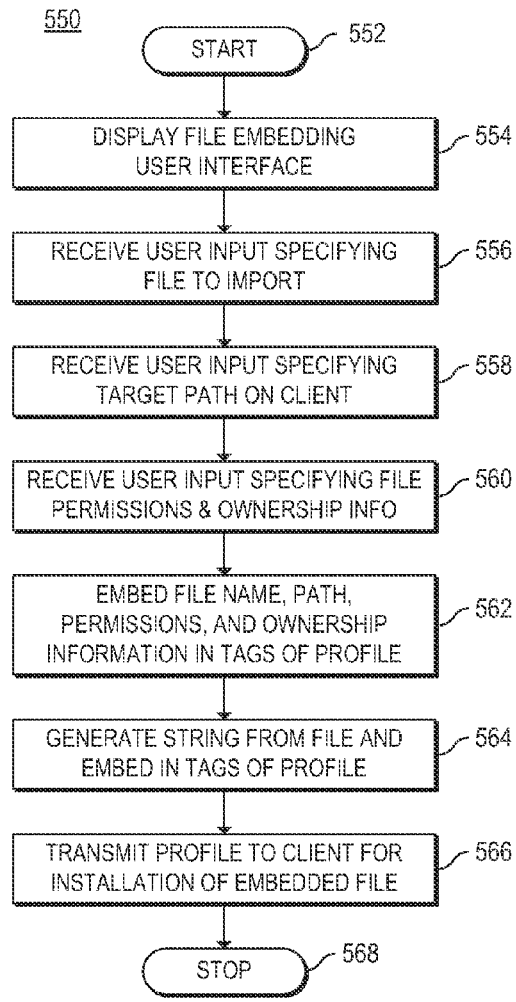
FIG. 5B is a flowchart of an example method for generating a client profile, the client profile including embedded files and corresponding file names, paths, permissions, and ownership information.

FIG. 5B is a flowchart of an example method 550 for generating a client profile, the client profile including embedded files and corresponding file names, paths, permissions, and ownership information. Although execution of method 550 is described below with reference to server computing device 350, other suitable devices for execution of method 550 will be apparent to those of skill in the art. Method 550 may be implemented in the form of executable instructions stored on a machine-readable storage medium and/or in the form of electronic circuitry.

Method 550 may start in block 552 and continue to block 554, where server 350 may display a user interface for embedding files within a profile 345, such as user interface 600 of FIG. 6. In block 556, server 350 may receive user input specifying a file to be imported into profile 345. For example, the user may specify a file locally available to server 350 or a file available on a device from which the user is remotely accessing the user interface. In block 558, server 350 may then receive user input specifying the target file name and path of the file on client 300. Next, in block 560, server 350 may receive additional metadata, such as file permissions and ownership information for the file to be embedded.

After receipt of the file and metadata, method 550 may continue to block 562, where server 350 may embed the file name, path, permissions, and ownership information within tags of profile 345. For example, server 350 may create a new set of tags for the file and embed each of the file name, the file path, the permissions, and the ownership information within a pair of tags. In block 564, server 350 may then convert the binary data of the file to a text string (e.g., a base64 string) and embed the file content in the profile within a pair of tags. Server 350 may then repeat blocks 554 to 564 for each additional file to be embedded within profile 345. Finally, in block 566, server 350 may transmit profile 345 to client 300 for installation of the embedded files on client 300. Method 550 may then stop in block 568.

FIG. 6 is a diagram of an example user interface 600 presented by a server for embedding files within a client profile. As illustrated, user interface 600 includes a path UI element 605 for allowing a user to specify a target path and file name for a file embedded within the client profile. In the illustrated user interface, the system administrator or other user may specify the target path and file name by typing the path within the text box. Note that, in some embodiments, two separate UI elements may be included, such that one element is used to input the file name, while another element is used to enter the file path.

User interface 600 also includes an import file button 610, which triggers the display of an additional interface for identifying a file to be embedded within the profile. For example, when the user activates button 610, the server may display an interface for navigating the files and directories of storage devices accessible to the server, thereby allowing the user to select a particular file to be embedded. When the user selects a file to be embedded, file size element 615 displays the total size of the selected file.

Interface 600 also includes owner UI element 620 and group UI element 625, which allow the user to specify file ownership information. In particular, owner element 620 allows the user to specify the username of the person who owns the file, while group element 625 specifies a user group that owns the file. In addition, permissions UI element 630 enables a user to specify the read, write, and execute permissions for the file's owner, group, and all other users. Finally, save UI element 635 saves the profile by embedding the selected file and metadata within the profile, while cancel UI element 640 cancels the file embedding operation. Note that, in order to embed multiple files in the profile, the user may interact with interface 600 once for each file.

FIG. 7 is an example structured document 700 for use as a client profile. Document 700 is encoded using sets of tags, where each attribute is opened using a first tag (<TAG>) and closed using a second tag (</TAG>). Here, the PROFILE pair of tags defines the start and end of the profile. The PROFILE-SETTINGS pair of tags defines a group of settings for the profile, which, in this case, only includes the NAME of the profile, "New-Profile."

As further illustrated, the PROFILEFILES pair of tags defines a set of files that are embedded within the profile. Here, only a single file is embedded in the profile, as illustrated by the one pair of FILE tags. More specifically, the illustrated profile includes a FILE named "logo.png" that is to be installed at the PATH "user/logos/" on the client device. The metadata in the profile specifies that the user OWNER is "admin," that the owner GROUP is "admins," and that the Unix PERMISSIONS are read-only for all users. Finally, the CONTENT tags embed the entire file "logo.png" within the profile as a base64 string.

The foregoing disclosure describes a number of example embodiments for generating and distributing a client profile. In particular, example embodiments enable an administrator to easily distribute files to one or more clients by embedding the files within the profile, specifying the target storage location of the files on the clients, and transmitting the profile to the clients for subsequent installation. Example embodiments thereby allow for efficient distribution of files to client devices and minimize the need for complex installation, uninstallation, and version tracking procedures. Additional embodiments and advantages of such embodiments will be apparent to those of skill in the art upon reading and understanding the foregoing description.

We claim:

1. A client computing device for installing a profile received from a server, the client computing device comprising:
 a processor and;
 a memory storing instructions that, when executed by the processor, cause the client computing device to:
  receive a client profile from the server, wherein the client profile is a structured document including (i) an embedded file comprising a text-based representation of a binary file, and (ii) metadata relating to the embedded file;
  determine a storage location for the embedded file on the client computing device using the metadata; and
  extract the embedded file from the structured document to the determined storage location on the client computing device;
  wherein extracting the embedded file from the structured document to the determined storage location comprises (i) converting the text-based representation to the binary file, and (ii) installing the binary file in the determined storage location on the client computing device.

2. The client computing device of claim 1, wherein:
 the metadata includes a file name and a file path; and
 the executed instructions cause the processor to determine the storage location for the embedded file by using the file name and the file path.

3. The client computing device of claim 2, wherein:
 the metadata further includes file permissions and file ownership information; and
 the executed instructions further cause the processor to write the file permissions and the file ownership information to the determined storage location along with the binary file.

4. The client computing device of claim 1, wherein the structured document is an Extensible Markup Language (XML) document.

5. The client computing device of claim 4, wherein the embedded file is included within a set of XML tags as a base64 string.

6. The client computing device of claim 1, wherein the executed instructions further cause the processor to:
 retrieve the client profile upon boot-up to configure the client computing device for communication with the server.

7. The client computing device of claim 1, wherein, when the embedded file replaces an existing file at the storage location, the executed instructions cause the processor to create a backup of the existing file prior to installing the binary file to the determined storage location.

8. The client computing device of claim 7, wherein, when the client profile is subsequently removed or a new profile is to be installed, the executed instructions further cause the processor to write the backup of the existing file to the determined storage location to restore the existing file.

9. The client computing device of claim 1, wherein the structured document further includes multiple embedded files and metadata associated the multiple embedded files, and wherein the executed instructions further cause the client computing device to:
 install each of a the multiple embedded files in a respective storage location on the client computing device based on the associated metadata.

10. A non-transitory machine-readable storage medium encoded with instructions for installing a profile received from a server, wherein the instructions, when executed by a processor of a client computing device, cause the client computing device to:
 receive a client profile from the server, wherein the client profile is a structured document including (i) an embedded file comprising updated configuration data for the client computing device, and (ii) metadata identifying a storage location for the updated configuration data on the client computing device; and
 extract the embedded file from the structured document to the identified storage location on the client computing device;
 wherein extracting the embedded file from the structured document to the identified storage location comprises installing the updated configuration data in the identified storage location on the client computing device.

11. The machine-readable storage medium of claim 10, wherein the embedded file is a base64 string embedded within a set of tags in the structured document.

12. The machine-readable storage medium of claim 11, wherein the structured document is an XML document.

13. The machine-readable storage medium of claim 10, wherein the executed instructions further cause the client computing device to:
 generate a backup of an existing file at the identified storage location when the embedded file replaces the existing file; and
 write the backup of the existing file to the identified storage location to restore the existing file prior to installing a new profile.

14. A method for installing a profile received from a server, the method performed by one or more processors of a client device and comprising:
 receiving a client profile from the server, wherein the client profile is a structured document including (i) an embedded file comprising updated certificate data for the client device, and (ii) metadata identifying a storage location for the updated certificate data for the client device; and
 extracting the embedded file from the structured document to the identified storage location on the client device;
 wherein extracting the embedded file from the structured document to the identified storage location comprises installing the updated certificate data in the identified storage location on the client device.

15. The method of claim 14, wherein the structured document is an XML document and the embedded file is a base64 string embedded within a set of tags in the structured document.

16. The method of claim 14, further comprising:
 generating a backup of an existing file at the identified storage location when the embedded file replaces the existing file; and
 writing the backup of the existing file to the identified storage location to restore the existing file prior to installing a new profile.

* * * * *